(12) United States Patent
Forster (10) Patent No.: US 12,421,075 B2
(45) Date of Patent: Sep. 23, 2025

(54) CORD REEL (71) Applicant: Kenneth Forster, Phoenix, AZ (US)

(72) Inventor: Kenneth Forster, Phoenix, AZ (US)

( * ) Notice: Subject to any disclaimer, the term of this patent is extended or adjusted under 35 U.S.C. 154(b) by 157 days.

(21) Appl. No.: 18/474,836

(22) Filed: Sep. 26, 2023

(65) Prior Publication Data
US 2024/0101388 A1 Mar. 28, 2024

Related U.S. Application Data (60) Provisional application No. 63/409,973, filed on Sep. 26, 2022.

(51) Int. Cl.
B65H 75/44 (2006.01)
B60R 9/06 (2006.01)
B60R 13/10 (2006.01)
B65H 75/40 (2006.01)

(52) U.S. Cl.
CPC ............. B65H 75/446 (2013.01); B60R 9/06 (2013.01); B60R 13/105 (2013.01); B65H 75/40 (2013.01); B65H 75/4426 (2013.01); B65H 75/4471 (2013.01)

(58) Field of Classification Search
CPC .... B65H 75/40; B65H 75/44; B65H 75/4426; B65H 75/4471
See application file for complete search history.

(56) References Cited

U.S. PATENT DOCUMENTS

| | | | |
|---|---|---|---|
| 5,056,698 A | 10/1991 | Kozakevich | |
| 5,094,396 A * | 3/1992 | Burke | H04M 1/15 242/375 |
| 5,255,767 A | 10/1993 | Norwood | |
| 5,267,705 A | 12/1993 | Hofrichter et al. | |
| 5,445,252 A | 8/1995 | McKee et al. | |
| 5,669,471 A | 9/1997 | Unze | |
| 5,803,216 A | 9/1998 | McNaught | |
| 6,264,016 B1 | 7/2001 | Bales | |
| 6,286,238 B1 | 9/2001 | Harrington | |
| 6,854,575 B1 | 2/2005 | Desormeaux et al. | |
| 6,981,670 B2 * | 1/2006 | Harrington | B65H 75/4426 242/402 |
| 9,136,684 B2 | 9/2015 | Giles | |
| D802,506 S | 11/2017 | Bargen et al. | |
| 2003/0038203 A1 | 2/2003 | Ohama | |
| 2019/0298984 A1 * | 10/2019 | Ethridge | A61M 39/08 |

* cited by examiner

Primary Examiner — Sang K Kim
(74) Attorney, Agent, or Firm — Finch & Maloney PLLC (57) ABSTRACT A cord reel has a housing made from a first sidewall and a second sidewall that are detachable and form a spool-receiving cavity. A spool is disposed within the spool-receiving cavity of the housing. A first port is formed in the first side of the housing and a first length of cord extends from the housing via the first port. A second port is defined by cooperating recesses in the first sidewall and the second sidewall and a second length of cord that is wound around the spool retractably extends out of the second port. One or both of a side weather guard and a cord weather guard are installed to protect the cord reel against weather. The side weather guard is mounted to the first sidewall and covers the first port, and the cord weather guard is mounted between the first and second sidewalls to cover the second port.

16 Claims, 5 Drawing Sheets

CORD REEL

TECHNICAL FIELD

This relates to a cord reel, and in particular, a cord reel that has a weatherproof housing.

BACKGROUND

Cord reels are used to manage cords, typically electrical cords, by allowing them to be retracted when not in use. A typical cord reel has a pigtail connection that extends out the side of the cord reel housing (typically a fixed length) to be connected to an electrical outlet, and a retractable cord that extends out the top of the housing in line with the plane of the spool within the housing. The retractable cord may carry a stopper that prevents the cord from being fully retracted into the housing.

SUMMARY

According to an aspect, there is provided a method of retrofitting a cord reel, the method comprising the steps of:
  providing a cord reel, where the cord reel comprises a housing having a first sidewall defining a first partial cavity, a second sidewall defining a second partial cavity, wherein the first sidewall is detachably connected to the second sidewall to define a spool-receiving cavity, the housing being assembled by threaded pin connectors that extend through pin-receiving apertures of the first sidewall; a spool disposed within the spool-receiving cavity of the housing; a first port formed in the first side of the housing; a first length of cord and extending from the housing via the first port; and a second port defined by cooperating recesses in the first sidewall and the second sidewall, a second length of cord being wound around the spool and extending out of the housing via the second port, the second length of cord being electrically connected to the first length of cord and carried by the spool such that the second length of cord is retractable;
  providing a side weather guard that that is sized to cover the first port on the first sidewall and comprises a series of attachment apertures that align with the threaded apertures of the housing; a cavity that receives the first length of cord that exits the first port; and an aperture that permits the first length of cord to pass therethrough;
  removing the threaded pin connectors from the housing; and
  placing the side weather guard over the first port and aligning the series of attachment apertures with the threaded apertures in the housing and attaching the side weather guard to the first sidewall with threaded pin connectors.

According to other aspects, the method may further comprise or more of the following features, alone or in combination: the threaded pin connectors from the cord reel may be used to attach side weather guard to the first sidewall; a sealant may be applied to the side weather guard; a cord weather guard may be provided that comprises a mounting flange and a sidewall that extends from the mounting flange, the mounting flange and the sidewall defining a central passage, the sidewall terminating in a stopper-receiving surface at a remote end relative to the mounting flange and the cord weather guard may be installed by: threading the second length of cord through the central passage of the cord weather guard; separating the first sidewall and the second sidewall; placing the mounting flange of the cord weather guard within the spool-receiving cavity such that the sidewall is surrounded by the second port; and re-engaging the first sidewall and the second sidewall to secure the cord weather guard in place.

According to an aspect, there is provided a cord reel for a retractable cord, the cord reel comprising:
  a housing comprising a first sidewall defining a first partial cavity, a second sidewall defining a second partial cavity, wherein the first sidewall is detachably connected to the second sidewall to define a spool-receiving cavity, the first sidewall having threaded apertures that receive threaded pin connectors used to assemble cord reel;
  a spool disposed within the spool-receiving cavity of the housing;
  a first port formed in the first side of the housing;
  a first length of cord extending from the housing via the first port;
  a second port defined by cooperating recesses in the first sidewall and the second sidewall, a second length of cord being wound around the spool and extending out of the housing via the second port, the second length of cord being electrically connected to the first length of cord and carried by the spool such that the second length of cord is retractable; and
  a side weather guard mounted to the first sidewall, the side weather guard covering the first port, the side weather guard comprising a complementary first port through which the first length of cord extends, the side weather guard having attachment apertures that correspond with the threaded apertures of the housing, the side weather guard being mounted by removing and replacing the threaded pin connectors such that the threaded pin connectors engage the side weather guard, the first sidewall and the second sidewall.

According to other aspects, the cord reel may include one or more of the following features, alone or in combination: for a retractable cord, the cord reel comprising: the side weather guard may have a flanged edge that contact the first sidewall and the flanged edge comprises the complementary first port; the side weather guard may comprise a sealant that prevents water egress between side weather guard and first sidewall; and a cord weather guard may be carried by the second port, the cord weather guard comprising a mounting flange, and a sidewall that extends from the mounting flange, the mounting flange and the sidewall defining a central passage, the sidewall terminating in a stopper-receiving surface at a remote end relative to the mounting flange, the cord weather guard being installed by separating the first sidewall and the second sidewall, placing the mounting flange of the cord weather guard within the spool-receiving cavity such that the sidewall extends from the second port, and re-engaging the first sidewall and the second sidewall.

According to an aspect, there is provided a method of retrofitting a cord reel, the method comprising the steps of:
  providing a cord reel comprising a housing having a first sidewall defining a first partial cavity, a second sidewall defining a second partial cavity, wherein the first sidewall is detachably connected to the second sidewall to define a spool-receiving cavity, the housing being assembled by threaded pin connectors that are received within pin-receiving apertures of the first sidewall; a spool disposed within the spool-receiving cavity of the housing; a first port formed in the first side of the housing; a first length of cord and extending from the housing via the first port; and a second port defined by cooperating recesses in the first sidewall and the second sidewall, a second length of cord being wound around the spool and extending out of the housing via the second port, the second length of cord being electrically connected to the first length of cord and carried by the spool such that the second length of cord is retractable;

providing a cord weather guard that comprises a mounting flange and a sidewall that extends from the mounting flange, the mounting flange and the sidewall defining a central passage, the sidewall terminating in a stopper-receiving surface at a remote end relative to the mounting flange; and installing the cord weather guard by threading the second length of cord through the central passage of the cord weather guard; separating the first sidewall and the second sidewall; placing the mounting flange of the cord weather guard within the spool-receiving cavity such that the sidewall is surrounded by the second port; and re-engaging the first sidewall and the second sidewall to secure the cord weather guard in place.

According to other aspects, the method may include one or more of the following features, alone or in combination: a stopper may be attached on the second length of cord, the being sized to engage the cord weather guard; a sealant may be applied to the cord weather guard; the method may include the steps of providing a side weather guard that that is sized to cover the first port on the first sidewall and comprises a series of attachment apertures that align with the threaded apertures of the housing, a cavity that receives the first length of cord that exits the first port, and an aperture that permits the first length of cord to pass therethrough; removing the original threaded pin connectors from the housing; and placing the side weather guard over the first port and aligning the series of attachment apertures with the threaded apertures in the housing and attaching the side weather guard to the first sidewall with threaded pin connectors.

According to an aspect, there is provided a cord reel for a retractable cord, the cord reel comprising:

a housing comprising a first sidewall and a second sidewall, wherein the first sidewall is detachably connected to the second sidewall to define a spool-receiving cavity, the housing being assembled by threaded pin connectors that are received within pin-receiving apertures of the first sidewall;

a spool disposed within the spool-receiving cavity of the housing;

a first port formed in the first side of the housing;

a first length of cord and extending from the housing via the first port;

a second port defined by cooperating recesses in the first sidewall and the second sidewall, a second length of cord being wound around the spool and extending out of the housing via the second port, the second length of cord being electrically connected to the first length of cord and carried by the cord reel such that the second length of cord is retractable; and a cord weather guard that is carried by the second port, the cord weather guard comprising a mounting flange, and a sidewall that extends from the mounting flange, the mounting flange and the sidewall defining a central passage, the sidewall terminating in a stopper-receiving surface at a remote end relative to the mounting flange, the cord weather guard being installed by separating the first sidewall and the second sidewall, placing the mounting flange of the cord weather guard within the spool-receiving cavity such that the sidewall extends from the second port, and re-engaging the first sidewall and the second sidewall.

According to other aspects, the cord reel may include one or more of the following features, alone or in combination: a stopper may be attached to the second length of cord, the stopper being sized to engage the stopper-receiving surface; a sealant may be applied to the cord weather guard; a side weather guard may be mounted to the first sidewall, the side weather guard covering the first port, the side weather guard comprising a complementary first port through which the first length of cord extends, the side weather guard having attachment apertures that correspond with the threaded apertures of the housing, the side weather guard being mounted by removing and replacing the threaded pin connectors such that the threaded pin connectors engage the side weather guard, the first sidewall and the second sidewall.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

A cord reel, generally identified by reference number 10, will now be described with reference to FIG. 1 through 10.

Figure 1:
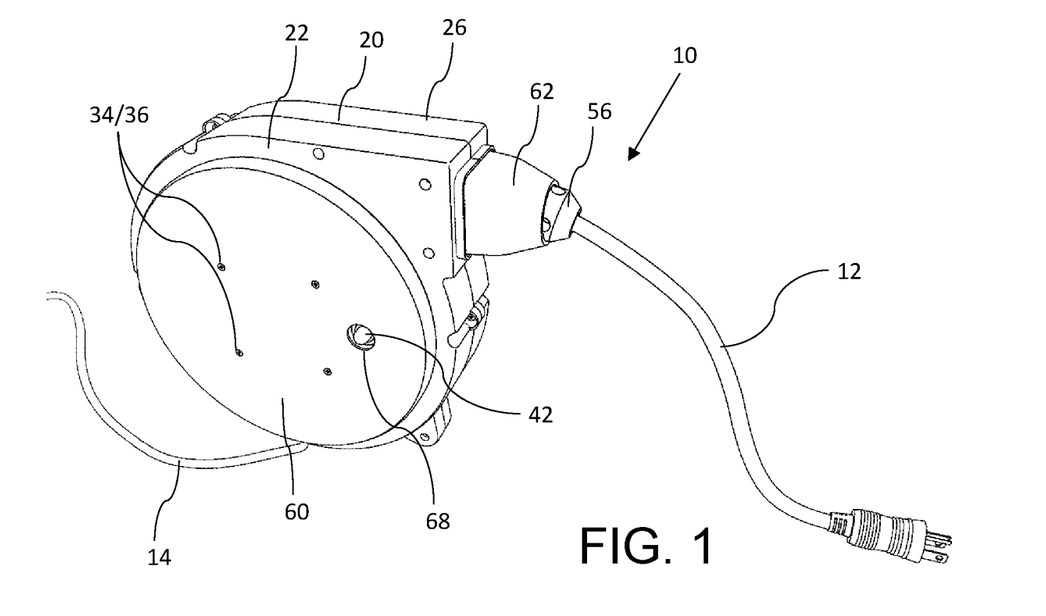
FIG. 1 is a perspective view of a cord reel with weather barriers installed.

Referring to FIG. 1, cord reel 10 has a retractable length of cord 12, a fixed length of cord 14, and is designed to be sealed against weather as discussed below. Cord reel 10 may be a pre-existing cord reel that is retrofit with weather barriers as discussed below.

Figure 2:
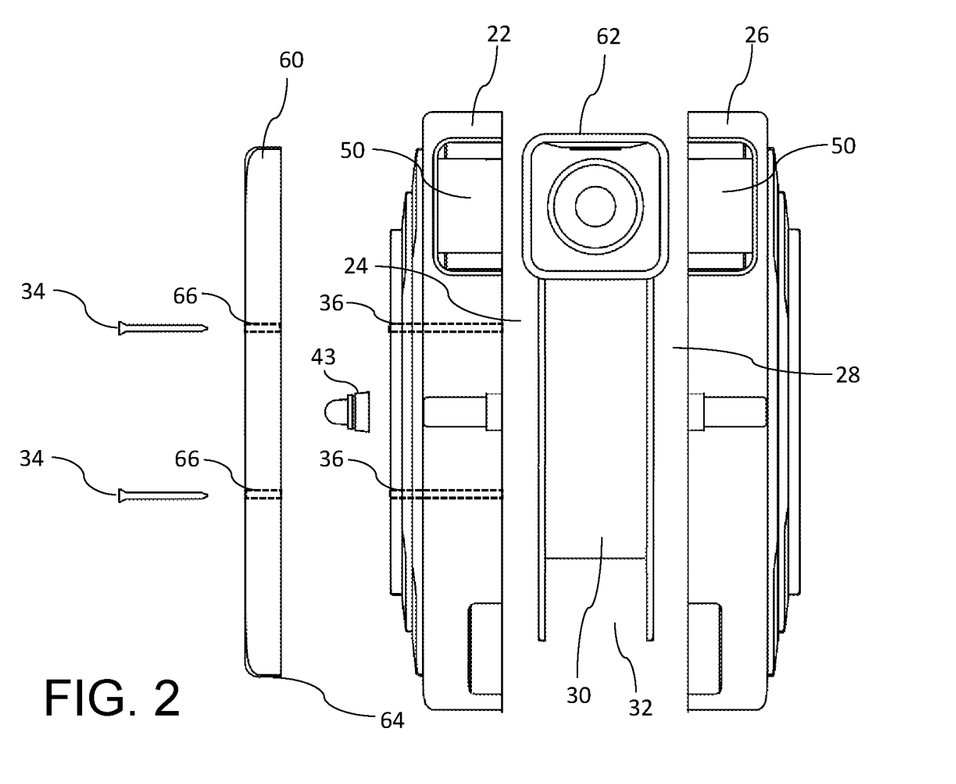
FIG. 2 is an exploded view of a cord reel and weather barriers.

Referring to FIG. 2, cord reel 10 includes a housing 20 comprising a first sidewall 22 defining a first partial cavity 24, and a second sidewall 26 defining a second partial cavity 28. First sidewall 22 and second sidewall 26 of cord reel 10 are shown separated with a spool 30 positioned therebetween. Retractable length of cord 12 is intended to be installed on spool 30, making it retractable. First sidewall 22 and second sidewall 26 cooperate when connected together to define a spool-receiving cavity 32. Housing 20 may be assembled by connecting first sidewall 22 to second sidewall 26, such as by screws or other suitable types of connectors. The connectors may also be used to assemble other elements of cord reel 10, such as elements positioned within housing 20. As depicted, at least some of the connectors may include threaded connectors 34 that engage apertures 36 (shown in FIG. 5). Spool 30 is disposed within spool-receiving cavity 32 of housing 20. The mechanism for retracting retractable length of cord 12 may vary between reel designs, however spool 30 is generally rotatable within housing 20. In some examples, spool 30 may have a rotational lock (not shown) that fixes the length of retractable cord 12 at a desired length and permits retractable cord to be retracted when released, such as by using a spring. Cord reel 10 may also include a resettable fuse or breaker 42 that may be accessed through an additional hole 40 in housing 20.

Figure 5:
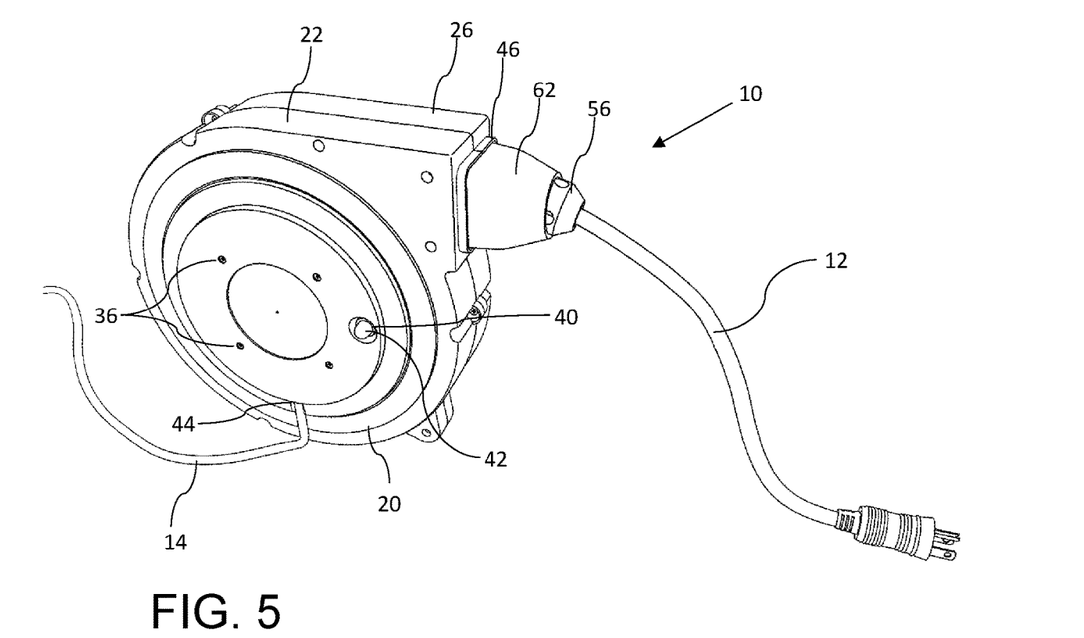
FIG. 5 is a perspective view of a cord reel with a cord weather guard.

Referring to FIG. 5, housing 20 has a first port 44 formed in first sidewall 22 of the housing that permits a fixed length of cord 14 to extend out from within housing 20 (shown as exiting the bottom left of housing 20) where it is electrically connected to retractable length of cord 12. First length of cord 14 may be a fixed length, and may be a male connector that allows the cord to be connected to a wall socket or other connection point. In some examples, fixed length of cord 14 may have some degree of adjustability, however the amount of length adjustability will be substantially less than the adjustable lengths with retractable length of cord 12. Referring to FIG. 2, housing 20 also has a second port 46 that is formed by cooperating recesses 50 in first sidewall 22 and second sidewall 26 of housing 20. Referring to FIGS. 2 and 5, a retractable length of cord 12 extends out from housing 20 in line with the rotational plane of spool 30. Retractable length of cord 12 is wound (not shown) around spool 30 and extends out through second port 46 such that retractable length of cord 12 is able to extend and retract as spool 30 rotates within housing 20. Second port 46 may include a guide or rollers to help retractable length of cord 52 extend and retract from housing 20. Referring to FIG. 5, second length of cord 52 may carry a stopper 56 that prevents retractable length of cord 52 from fully retracting within housing 20. Stopper 56 may be removable or adjustable along the length of cord 52.

Referring to FIGS. 1 and 2, cord reel 10 may have a side weather guard 60 mounted to first sidewall 22 and a cord weather guard 62 adjacent to second port 46. Side weather guard 60 and cord weather guard 62 are used to reduce or prevent the egress of water into housing 20 through first sidewall 22 and/or through second port 46 such that cord reel 10 is more suitable for outdoor applications.

Figure 3:
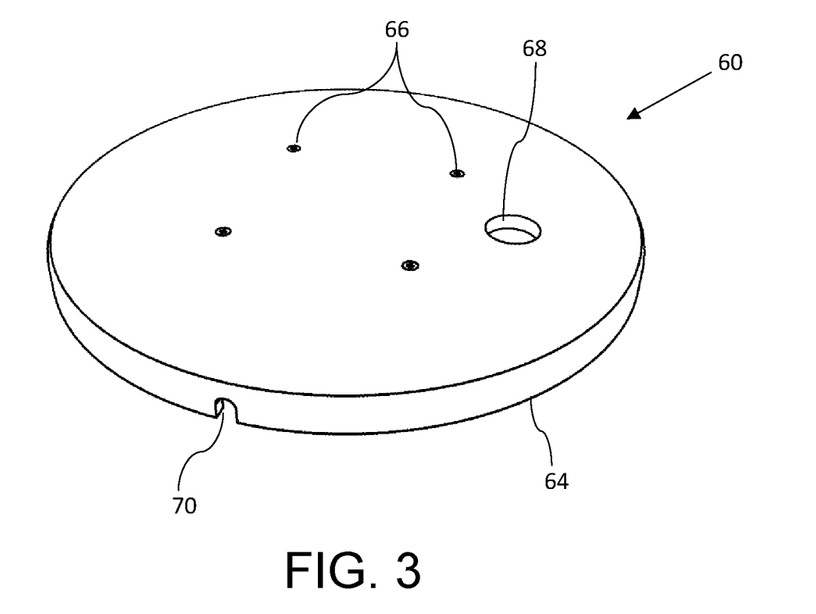
FIG. 3 is a top perspective view of a side weather guard.
Figure 4:
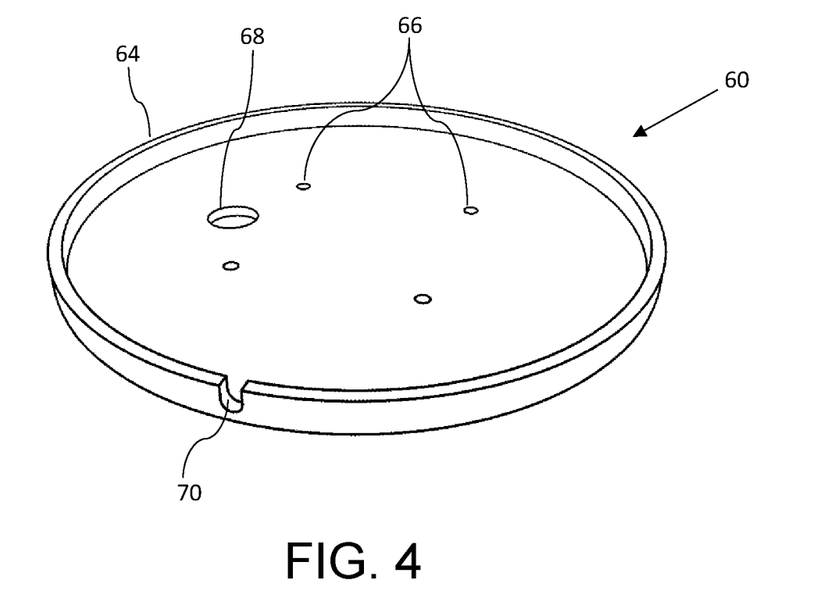
FIG. 4 is a bottom perspective view of a side weather guard.
Figure 10:
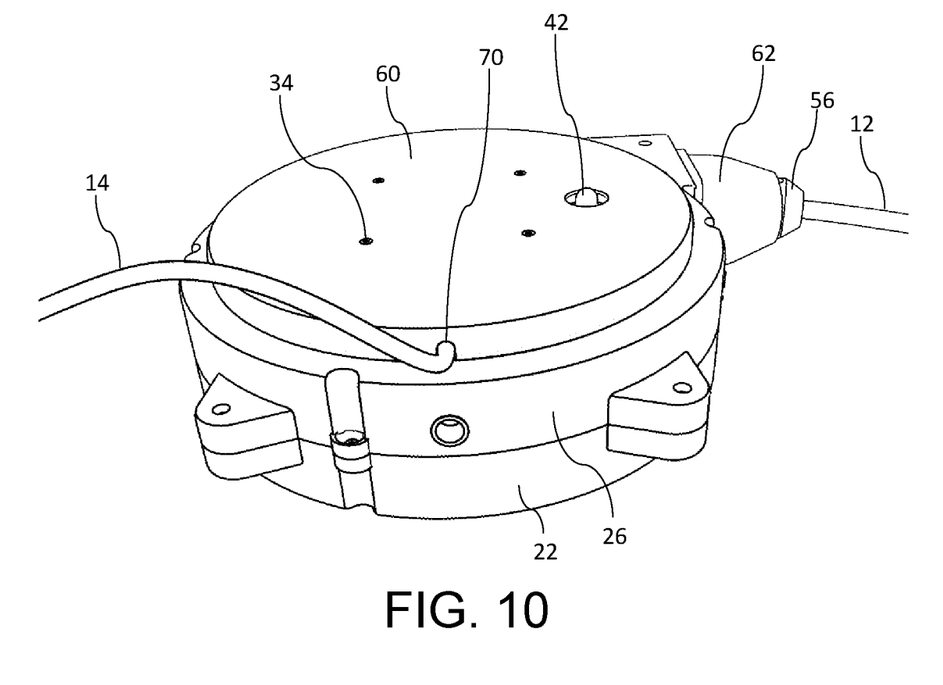
FIG. 10 is a bottom perspective view of a cord reel with a cord weather guard.

Referring to FIGS. 3 and 4, side weather guard may have a flanged edge 64 that defines a concave structure, a receiving aperture 70 sized to receive cord 14, a fuse aperture 68 sized to permit access to an underlying fuse 42 (shown in FIG. 5) and/or a flexible seal 43. Referring to FIG. 2, side weather guard 60 is designed to cover at least a portion of first sidewall 24, or at the very least cover openings, such as seams, joints, apertures, etc. in first sidewall 24 that may otherwise act as a point of egress for precipitation, such as those shown in FIG. 5. Referring to FIG. 2, flanged edge 64 may be sized to contact first sidewall 22 around a predetermined portion of sidewall 24 and a portion of fixed length cord 14 that exits port 44. As shown, side weather guard 60 has a cord-receiving aperture 70 in flanged edge 64 that is sized to receive fixed length of cord 14 to pass through. Referring to FIG. 10, cord-receiving aperture 70 may be positioned towards a bottom of side weather guard 60 to reduce the risk of precipitation entering side weather guard 60. Referring to FIG. 2, side weather guard 60 may have a plurality of attachment apertures 66 for attaching side weather guard 60 to housing 20 using threaded pin connectors 34. Attachment apertures 66 may be substantially aligned with apertures 36 of housing 20. Side weather guard 60 may have a fuse aperture 68 that allows access to resettable fuse 42. A flexible seal 43 may be installed between resettable fuse and fuse aperture 68 to prevent water egress through fuse aperture 68 while still allowing a user to activate resettable fuse 68. Seal 43 may be compressed or otherwise engaged between side weather guard 60 and first sidewall 22 to prevent water egress through fuse aperture 68.

Referring to FIG. 2, in one retrofit example, where guards 60 and 62 are installed on an existing cord reel 10, side weather guard 60 may be installed by removing the existing, or original, threaded pin connectors 34 from housing 20, and aligning side weather guard 60 such that attachment apertures 66 of side weather guard 60 align with threaded apertures 36 of housing 20, fixed length of cord 14 is received by cord-receiving aperture 70, and resettable fuse 42 is accessible through fuse aperture 68. Side weather guard 60 is then secured in place on housing 20 with resettable fuse 42 and fixed length of cord 14 accessible by reinserting pin connectors 34 that were removed from housing 20, or with new pin connectors 34, which may have an extended length to accommodate the width of side weather guard 60, if necessary. Side weather guard 60 engages housing 20 in such a way that it protects against water egress via first port 44, e.g., along first length of cord 14. Side weather guard 60 may fully or partially form a seal against first sidewall 22, such as along flanged edge 64. Side weather guard 60 may be designed to fix multiple styles of cord reels, such as with selectable apertures or ports (not shown), which are either covered by frangible covers or plugged by removable seals, or seals that are insertable after the desired apertures or ports are selected.

Figure 6:
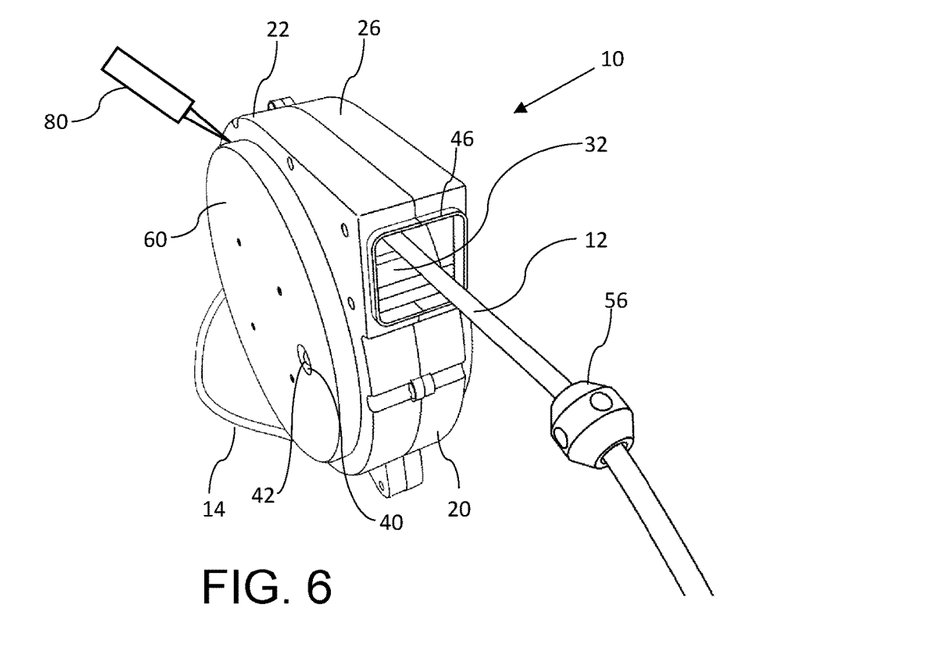
FIG. 6 is a perspective view of a cord real with a side weather guard.

Referring to FIG. 6, side weather guard 60 may be further sealed, such as by application of a sealant 80 or weather stripping (not shown) to locations where water may be able to pass underneath side weather guard 60. The sealant or weather stripping may be applied before or after side weather guard 60 is attached to housing 20 using threaded pin connectors 34, and may be applied according to any or all of the following: between flanged edge 64 and first sidewall 22, between threaded pin connectors 34 and attachment apertures 66, overtop of threaded pin connectors 34 and attachment apertures 66, and between fixed length of cord 14, first sidewall 22, and cord receiving aperture 70. In another example, the edges of side weather guard 60 may be treated with a resilient sealing material so that a seal is created during installation of side weather guard 60 on cord reel 12.

Figure 7:
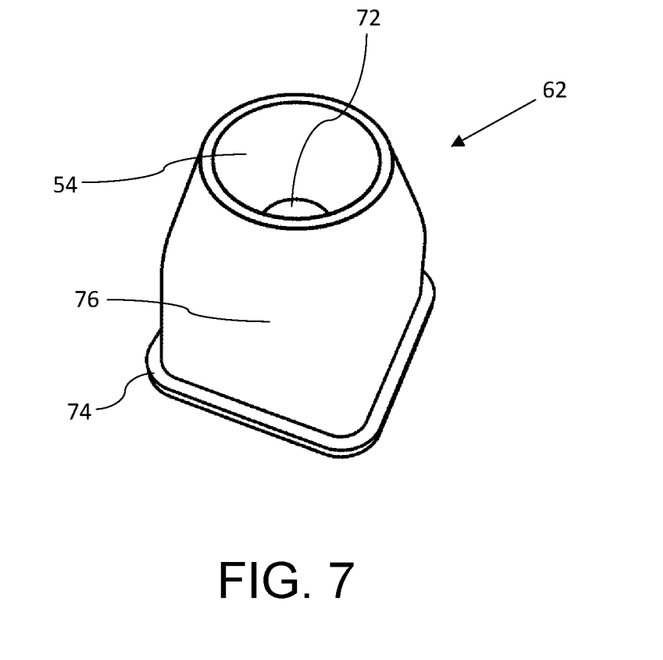
FIG. 7 is a perspective view of a cord weather guard.
Figure 8:
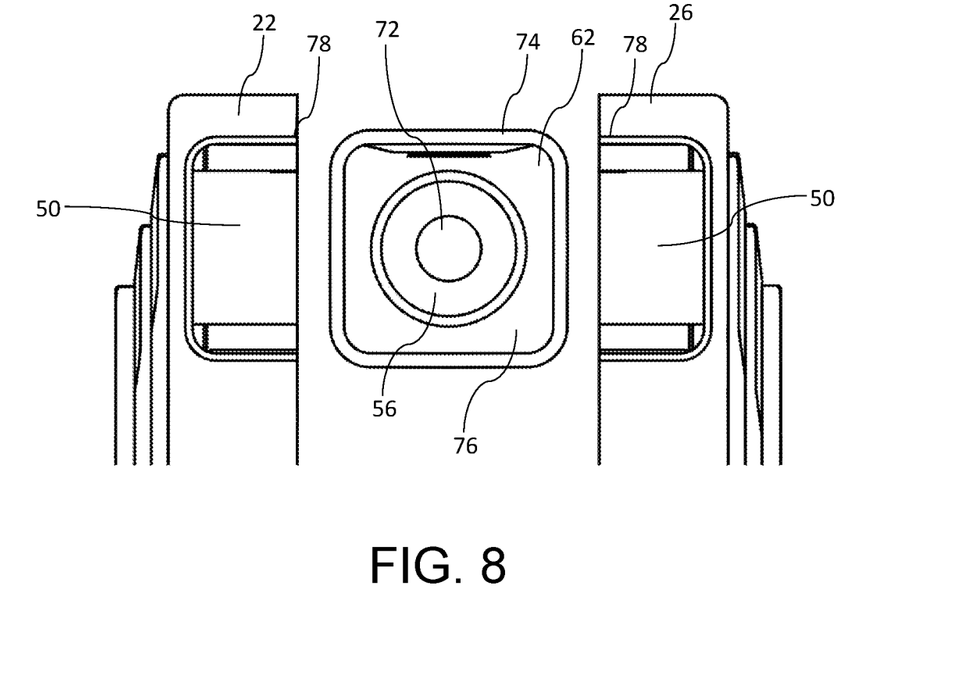
FIG. 8 is a detailed exploded view of a cord reel and cord weather guard.

Referring to FIG. 7, cord weather guard 62 includes a mounting flange 74 and a side wall 76 that extends from mounting flange 74 and terminates at a stopper-receiving surface 54 at a remote end of cord weather guard 62 relative to mounting flange 74. Referring to FIGS. 6 and 8, mounting flange 74 and side wall 76 define a central passage 72 through which retractable length of cord 12 may pass. Mounting flange 74 is received by first and second sidewalls 22 and 26 to secure cord weather guard 62 to cord reel 10. Stopper-receiving surface 54 may surround central passage 72 and may be sized to receive stopper 56. Stopper-receiving surface 54 and stopper 56 may have complementary concave and convex hemispherical shapes, respectively, which helps protect against water egress into cavity 32 of housing 20 when stopper 56 is received.

Figure 9:
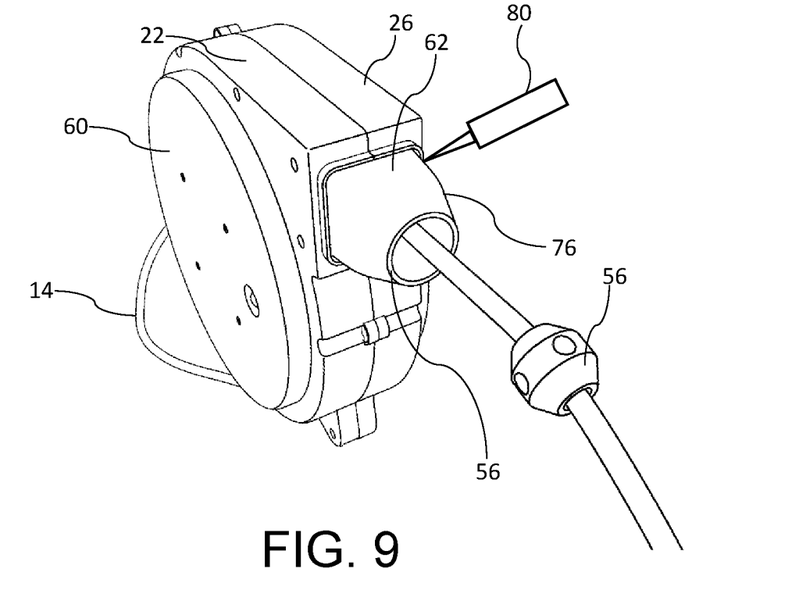
FIG. 9 is a side perspective view of a cord reel with side and cord weather guards.

Referring to FIGS. 8 and 9, cord weather guard 62 is installed by extending retractable length of cord 12 through a central passage 72 of cord weather guard 62. Then, with first sidewall 22 and second sidewall 26 separated as shown in FIG. 8, mounting flange 74 of cord weather guard 62 is placed between the cooperating recesses 50 such that mounting flange 74 is received by a groove 78 of cooperating recesses 50, and re-engaging first sidewall 22 and second sidewall 26 to secure cord weather guard 62 in place. In other examples, cord weather guard 62 may also be installed using a clip (not shown) that engages between second port 46 and cord guard 62 to provide a similar seal.

Cord weather guard 62 may be made from a resilient material, or the edge may be treated with a resilient material, to form a seal when assembled. Alternatively, Referring to FIG. 9, cord weather guard 62 may be sealed by application of a sealant 80 or by weather stripping (not shown) to locations where water may be able to bypass cord weather guard 62 into housing 20. Sealant may be applied before or after cord weather guard 62 is mounted between first and second sidewalls 22 and 26. In one example, sealant may be applied to second port 46 before mounting flange 74 is secured within second port 46.

Side weather guard 60 and cord weather guard 62 may be installed on an existing cord reel 10 as part of a method of retrofitting the existing cord reel 10. The existing cord reel may be retrofitted to improve protection against weather so that the retrofitted cord reel 10 may be used in outdoor environments. Alternatively, side weather guard 60 and cord weather guard 62 may be installed as part of the manufacturing process.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of retrofitting a cord reel, comprising:
   providing a cord reel comprising:
      a housing comprising a first sidewall defining a first partial cavity, a second sidewall defining a second partial cavity, wherein the first sidewall is detachably connected to the second sidewall to define a spool-receiving cavity, the housing being assembled by pin connectors that extend through pin-receiving apertures of the first sidewall;
      a spool disposed within the spool-receiving cavity of the housing;
      a first port formed in the first side of the housing;
      a first length of cord and extending from the housing via the first port;
      a second port defined by cooperating recesses in the first sidewall and the second sidewall, a second length of cord being wound around the spool and extending out of the housing via the second port, the second length of cord being electrically connected to the first length of cord and carried by the spool such that the second length of cord is retractable;
   providing a side weather guard that that is sized to cover the first port on the first sidewall and comprises:
      a series of attachment apertures that align with the pin-receiving apertures of the housing;
      a cavity that receives the first length of cord that exits the first port; and
      an aperture that permits the first length of cord to pass therethrough;
   removing the pin connectors from the housing; and
   placing the side weather guard over the first port and aligning the series of attachment apertures with the pin-receiving apertures in the housing and attaching the side weather guard to the first sidewall with the pin connectors.

2. The method of claim 1, wherein the pin connectors from the cord reel are used to attach side weather guard to the first sidewall.

3. The method of claim 1, further comprising the step of applying a sealant to the side weather guard.

4. The method of claim 1, further comprising the steps of:
   providing a cord weather guard that comprises a mounting flange and a sidewall that extends from the mounting flange, the mounting flange and the sidewall defining a central passage, the sidewall terminating in a stopper-receiving surface at a remote end relative to the mounting flange; and
   installing the cord weather guard by:
      threading the second length of cord through the central passage of the cord weather guard;
      separating the first sidewall and the second sidewall;
      placing the mounting flange of the cord weather guard within the spool-receiving cavity such that the sidewall is surrounded by the second port; and
      re-engaging the first sidewall and the second sidewall to secure the cord weather guard in place.

5. A cord reel for a retractable cord, the cord reel comprising:
   a housing comprising a first sidewall defining a first partial cavity, a second sidewall defining a second partial cavity, wherein the first sidewall is detachably connected to the second sidewall to define a spool-receiving cavity, the first sidewall having pin-receiving apertures that receive pin connectors used to assemble the cord reel;
   a spool disposed within the spool-receiving cavity of the housing;
   a first port formed in the first side of the housing;
   a first length of cord extending from the housing via the first port;
   a second port defined by cooperating recesses in the first sidewall and the second sidewall, a second length of cord being wound around the spool and extending out of the housing via the second port, the second length of cord being electrically connected to the first length of cord and carried by the spool such that the second length of cord is retractable; and
   a side weather guard mounted to the first sidewall, the side weather guard covering the first port, the side weather guard comprising a complementary first port through which the first length of cord extends, the side weather guard having attachment apertures that correspond with the pin-receiving apertures of the housing, the side weather guard being mounted by removing and replacing the pin connectors such that the pin connectors engage the side weather guard, the first sidewall and the second sidewall.

6. The cord reel of claim 5, wherein the side weather guard has a flanged edge that contact the first sidewall and the flanged edge comprises the complementary first port.

7. The cord reel of claim 5, wherein the side weather guard comprises a sealant that prevents water egress between side weather guard and first sidewall.

8. The cord reel of claim 5, further comprising a cord weather guard that is carried by the second port, the cord weather guard comprising a mounting flange, and a sidewall that extends from the mounting flange, the mounting flange and the sidewall defining a central passage, the sidewall terminating in a stopper-receiving surface at a remote end relative to the mounting flange, the cord weather guard being installed by separating the first sidewall and the second sidewall, placing the mounting flange of the cord weather guard within the spool-receiving cavity such that the sidewall extends from the second port, and re-engaging the first sidewall and the second sidewall.

9. A method of retrofitting a cord reel, comprising:
  providing a cord reel comprising:
    a housing comprising a first sidewall defining a first partial cavity, a second sidewall defining a second partial cavity, wherein the first sidewall is detachably connected to the second sidewall to define a spool-receiving cavity, the housing being assembled by pin connectors that are received within pin-receiving apertures of the first sidewall;
    a spool disposed within the spool-receiving cavity of the housing;
    a first port formed in the first side of the housing;
    a first length of cord and extending from the housing via the first port; and
    a second port defined by cooperating recesses in the first sidewall and the second sidewall, a second length of cord being wound around the spool and extending out of the housing via the second port, the second length of cord being electrically connected to the first length of cord and carried by the spool such that the second length of cord is retractable;
  providing a cord weather guard that comprises a mounting flange and a sidewall that extends from the mounting flange, the mounting flange and the sidewall defining a central passage, the sidewall terminating in a stopper-receiving surface at a remote end relative to the mounting flange; and
  installing the cord weather guard by:
    threading the second length of cord through the central passage of the cord weather guard;
    separating the first sidewall and the second sidewall;
    placing the mounting flange of the cord weather guard within the spool-receiving cavity such that the sidewall is surrounded by the second port; and
    re-engaging the first sidewall and the second sidewall to secure the cord weather guard in place.

10. The method of claim 9, further comprising the steps of:
  providing a side weather guard that that is sized to cover the first port on the first sidewall and comprises:
    a series of attachment apertures that align with the pin-receiving apertures of the housing;
    a cavity that receives the first length of cord that exits the first port; and
    an aperture that permits the first length of cord to pass therethrough;
  removing the pin connectors from the housing; and
  placing the side weather guard over the first port and aligning the series of attachment apertures with the pin-receiving apertures in the housing and attaching the side weather guard to the first sidewall with the pin connectors.

11. The method of claim 9, further comprising the step of attaching a stopper on the second length of cord, the being sized to engage the cord weather guard.

12. The method of claim 9, further comprising the step of applying a sealant to cord weather guard.

13. A cord reel for a retractable cord, the cord reel comprising:
  a housing comprising a first sidewall and a second sidewall, wherein the first sidewall is detachably connected to the second sidewall to define a spool-receiving cavity, the housing being assembled by pin connectors that are received within pin-receiving apertures of the first sidewall;
  a spool disposed within the spool-receiving cavity of the housing;
  a first port formed in the first side of the housing;
  a first length of cord and extending from the housing via the first port;
  a second port defined by cooperating recesses in the first sidewall and the second sidewall, a second length of cord being wound around the spool and extending out of the housing via the second port, the second length of cord being electrically connected to the first length of cord and carried by the cord reel such that the second length of cord is retractable; and
  a cord weather guard that is carried by the second port, the cord weather guard comprising a mounting flange, and a sidewall that extends from the mounting flange, the mounting flange and the sidewall defining a central passage, the sidewall terminating in a stopper-receiving surface at a remote end relative to the mounting flange, the cord weather guard being installed by separating the first sidewall and the second sidewall, placing the mounting flange of the cord weather guard within the spool-receiving cavity such that the sidewall extends from the second port, and re-engaging the first sidewall and the second sidewall.

14. The cord reel of claim 13, further comprising a side weather guard mounted to the first sidewall, the side weather guard covering the first port, the side weather guard comprising a complementary first port through which the first length of cord extends, the side weather guard having attachment apertures that correspond with the pin-receiving apertures of the housing, the side weather guard being mounted by removing and replacing the pin connectors such that the pin connectors engage the side weather guard, the first sidewall and the second sidewall.

15. The cord reel of claim 13, further comprising a stopper attached to the second length of cord, the stopper being sized to engage the stopper-receiving surface.

16. The cord reel of claim 13, wherein the cord weather guard comprises a sealant between the cord weather guard and the second port.

* * * * *